(12) United States Patent
Wright

(10) Patent No.: US 6,534,719 B2
(45) Date of Patent: Mar. 18, 2003

(54) APPARATUS FOR THE INSTALLATION OF SPRING CLIPS, ESPECIALLY ELECTROSTATIC ANIMAL GUARDS

(75) Inventor: Jeff Wright, 31950 Oak Ridge Pkwy., Bulverde, TX (US) 78163-3042

(73) Assignee: Jeff Wright, Bulverde, TX (US)

( * ) Notice: Subject to any disclaimer, the term of this patent is extended or adjusted under 35 U.S.C. 154(b) by 0 days.

(21) Appl. No.: 09/863,719

(22) Filed: May 23, 2001

(65) Prior Publication Data

US 2002/0175000 A1 Nov. 28, 2002

(51) Int. Cl.[7] ............................................. H01B 17/00
(52) U.S. Cl. ................ 174/139; 174/40 R; 174/40 CC; 174/135; 52/101
(58) Field of Search ............................. 174/139, 40 R, 174/40 CC, 140 R, 5 R, 135; 52/101; 361/232

(56) References Cited

U.S. PATENT DOCUMENTS 3,613,683 A * 10/1971 Kees, Jr. ..................... 128/325
5,648,641 A * 7/1997 Guthrie ....................... 174/139

* cited by examiner

*Primary Examiner*—Dean A. Reichard
*Assistant Examiner*—W. David Walkenhorst
(74) *Attorney, Agent, or Firm*—David G. Henry

(57) ABSTRACT

This invention concerns an apparatus to assist in the installation of certain spring clips such as those embodied in an Electrostatic Animal Guard. The apparatus structure is primarily a series of offset tines by which the clip can be held. In addition to these tines is a slidable bar that further holds the clip. Movement of the bar alters the apparatus's relative hold on the clip allowing for seating and release of the clip when the bar is in one position, and preventing the seating and release of the clip when in another position.

1 Claim, 7 Drawing Sheets

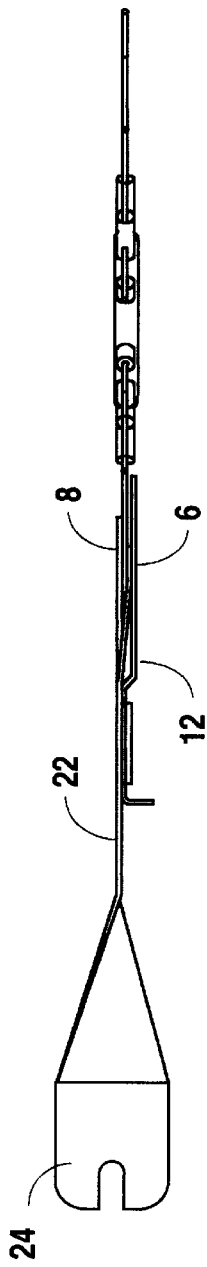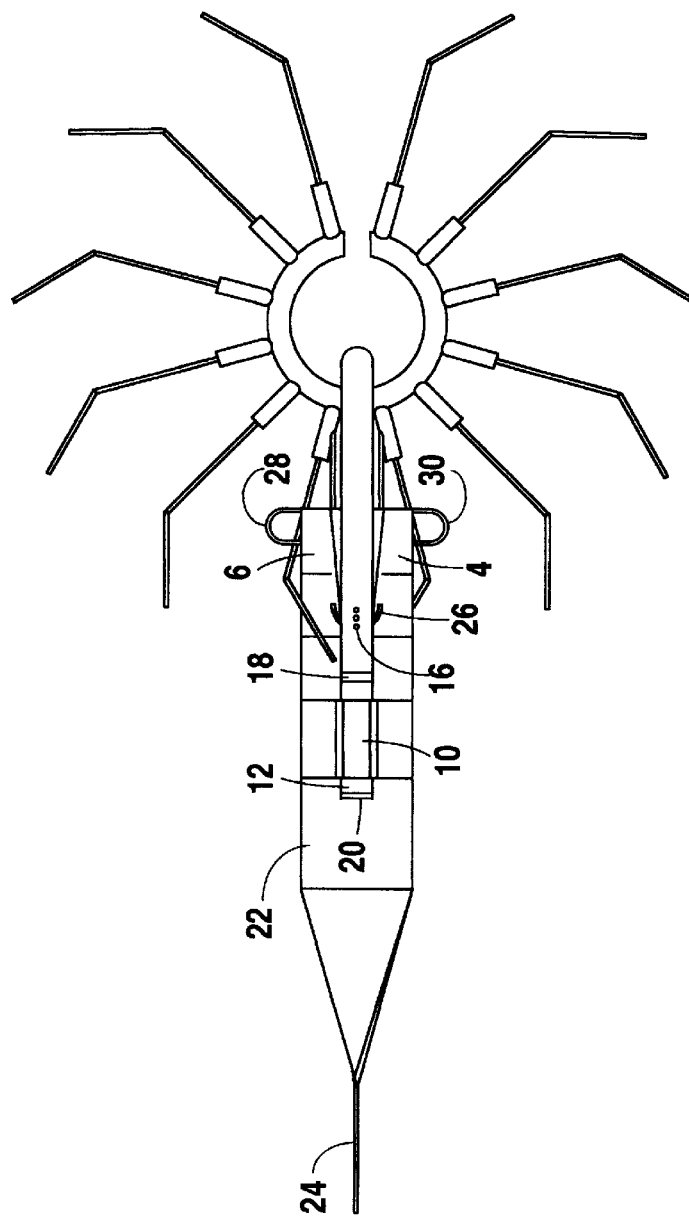

APPARATUS FOR THE INSTALLATION OF SPRING CLIPS, ESPECIALLY ELECTROSTATIC ANIMAL GUARDS

BACKGROUND OF THE INVENTION

1. Field of the Invention

The present invention relates to devices used in the installation of spring clip type devices, and more particularly Electrostatic Animal Guards.

2. Background Information

This apparatus is designed primarily for attaching devices like the Electrostatic Animal Guard, or similar devices that have a spring clip design similar to the Animal Guard. The clip attaches to high voltage insulators, bushing, and similar electrical equipment, which can be live during installation. Using a long insulated rod known as a hot stick, these clips can be installed from the ground or from an elevated bucket. Prior to this apparatus, a slotted receptacle held the rear of the clip to the long hot stick. The disadvantages of these receptacles are two-fold: first, there was no mechanism to prevent the clip from accidently attaching between the wrong skirts, a problem when installation is performed from the ground on an elevated insulator having numerous skirts; second, there was no mechanism to stop the clip from being further advanced once the clip was properly installed, a potential cause of clip damage.

SUMMARY OF THE INVENTION

It is an object of the present invention to provide a novel apparatus for installing specialized spring clips, such as embodied in the Electrostatic Animal Guard.

It is an object of the present invention to provide a novel apparatus which securely holds a clip, and reduces the chance of accidental engagement of clip by means of a resisting bar which can be released by the operator's indirect manipulation.

It is an additional object of the present invention to provide a novel apparatus which releases the clip when the clip is properly attached to the targeted item.

It is a further object of the present invention to provide a novel apparatus which prevents a clip from being damaged by preventing clip from being further forced once the clip is properly attached.

In satisfaction of these and related objectives, the present invention for installing spring clips, especially Electrostatic Animal Guards, comprises a body with fork-like extending tines, the staggering of which allows for the clip to be inserted therein. Extending also in the same direction is a slidable bar. This bar, in its most distal position, protrudes far enough to prevent the clip from fully attaching to the insulator body until the bar is pushed reward. Additionally, the bar has means to hold the clip in place when the bar is distally extended. The bar, now contacting the targeted item, is pushed back to the rear stopping point once additional force is exerted. The rear stopping point coincides with the clip properly seating on the target, such as an insulator. Additionally, this stopping prevents further exertions on the clip, thus preventing damage to clip.

Simultaneously with the sliding back of the bar, and the clip's attachment to the target, the means for locking the clip is moved back with the sliding bar and thus no longer locks the clip into the apparatus.

BRIEF DESCRIPTION OF THE DRAWINGS

FIG. 4 is an overhead view of the apparatus and clip of FIG. 3.

FIG. 5 is a side view of the apparatus of FIG. 3.

DETAILED DESCRIPTION OF THE PREFERRED EMBODIMENT

The embodiment of the apparatus as illustrated in FIGS. 1, 3–8, is primarily intended to be used in the installation of Electrostatic Animal Guards, such as described in U.S. Pat. No. 5,648,641, incorporated herein by reference. The practiced embodiment of the guards individually illustrated in FIG. 2. As the portion of the Electrostatic Animal Guard particularly pertinent to this new invention is the clip structure, and to be consistent with the claims, the Electrostatic Animal Guard will hereafter be referred to as a clip.

Figure 1:
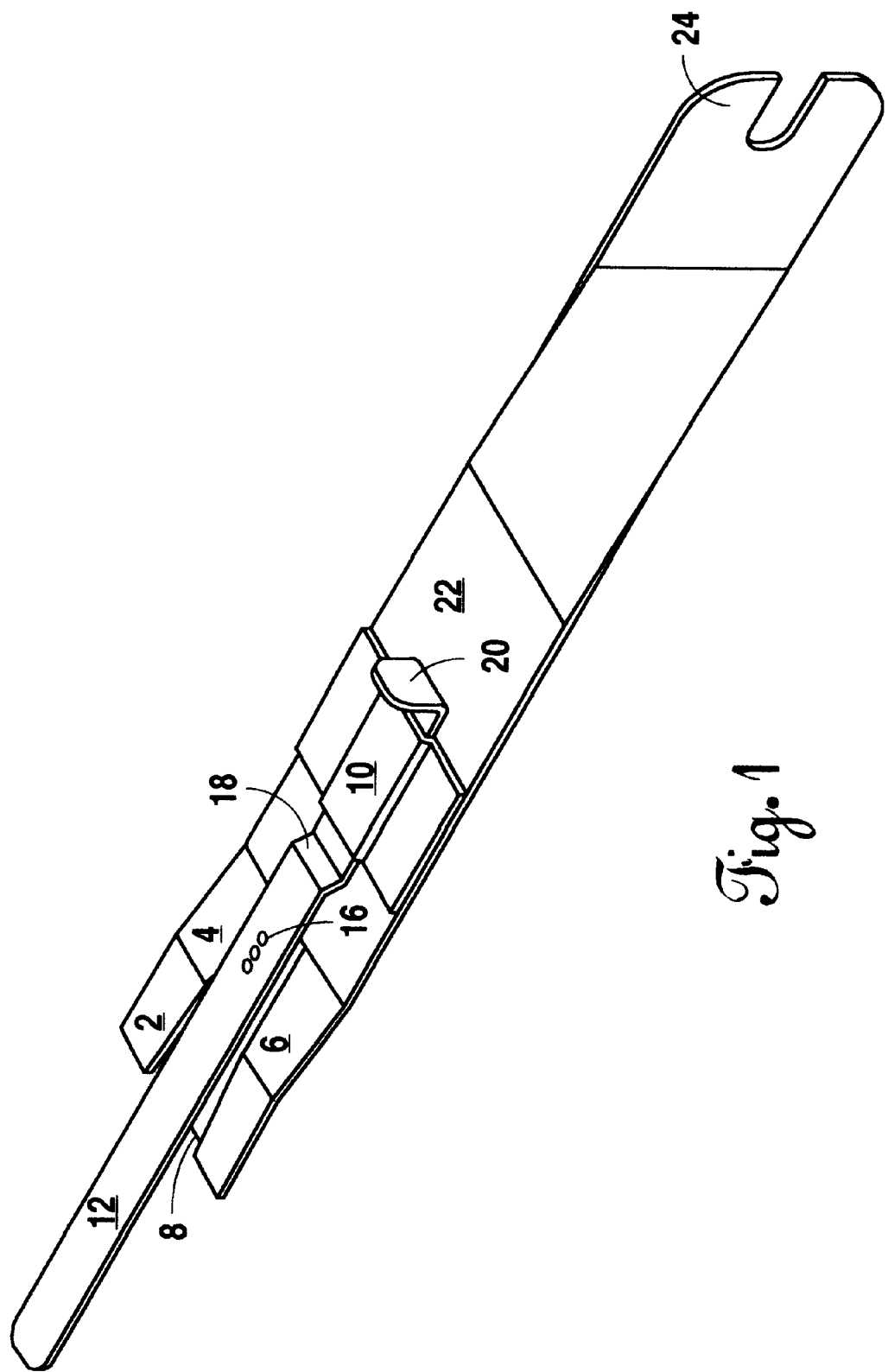
FIG. 1 is a perspective view of the apparatus of the present invention.
Figure 6:
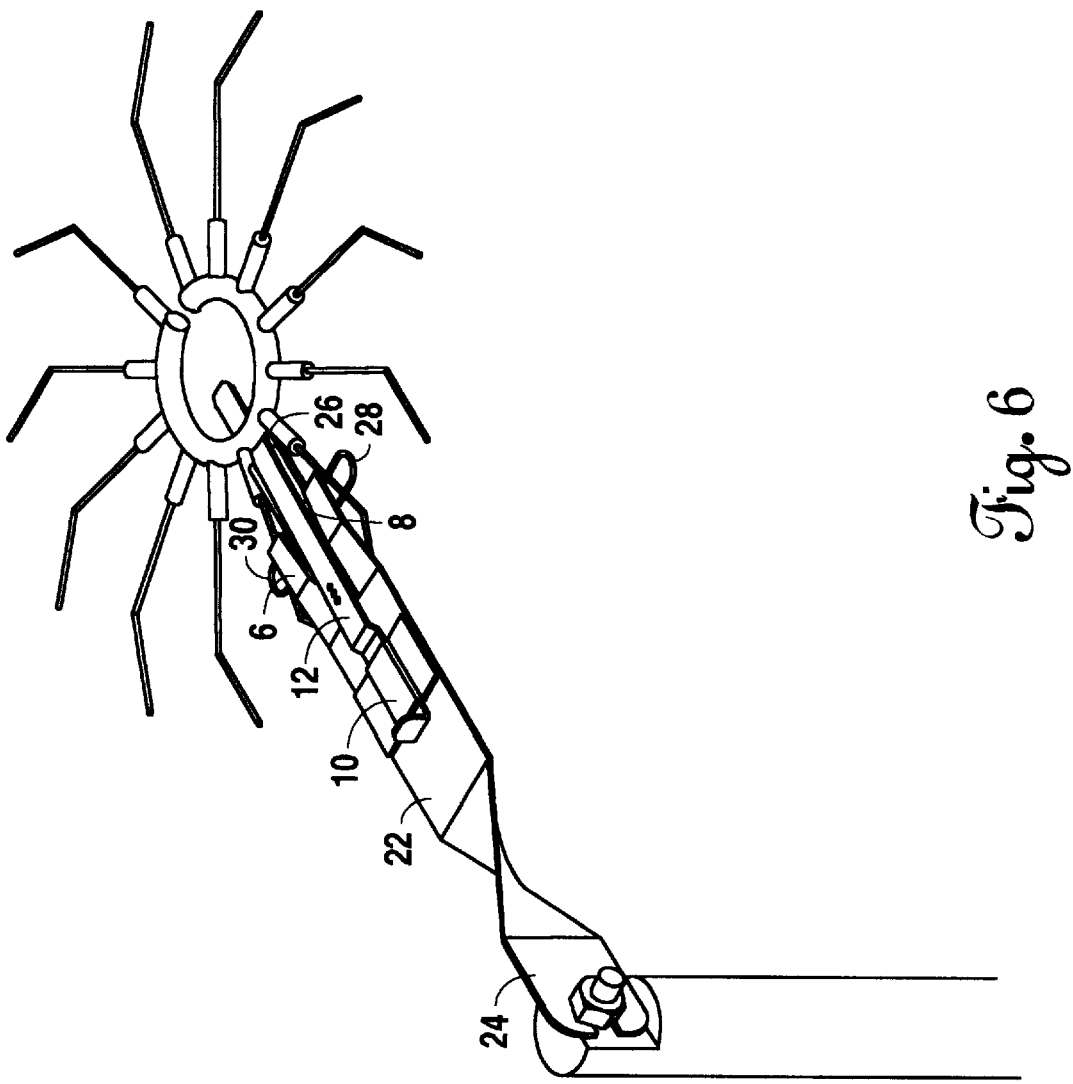
FIG. 6 is a perspective view of the apparatus and clip of FIG. 3 with apparatus shown connected to hot stick.
Figure 7:
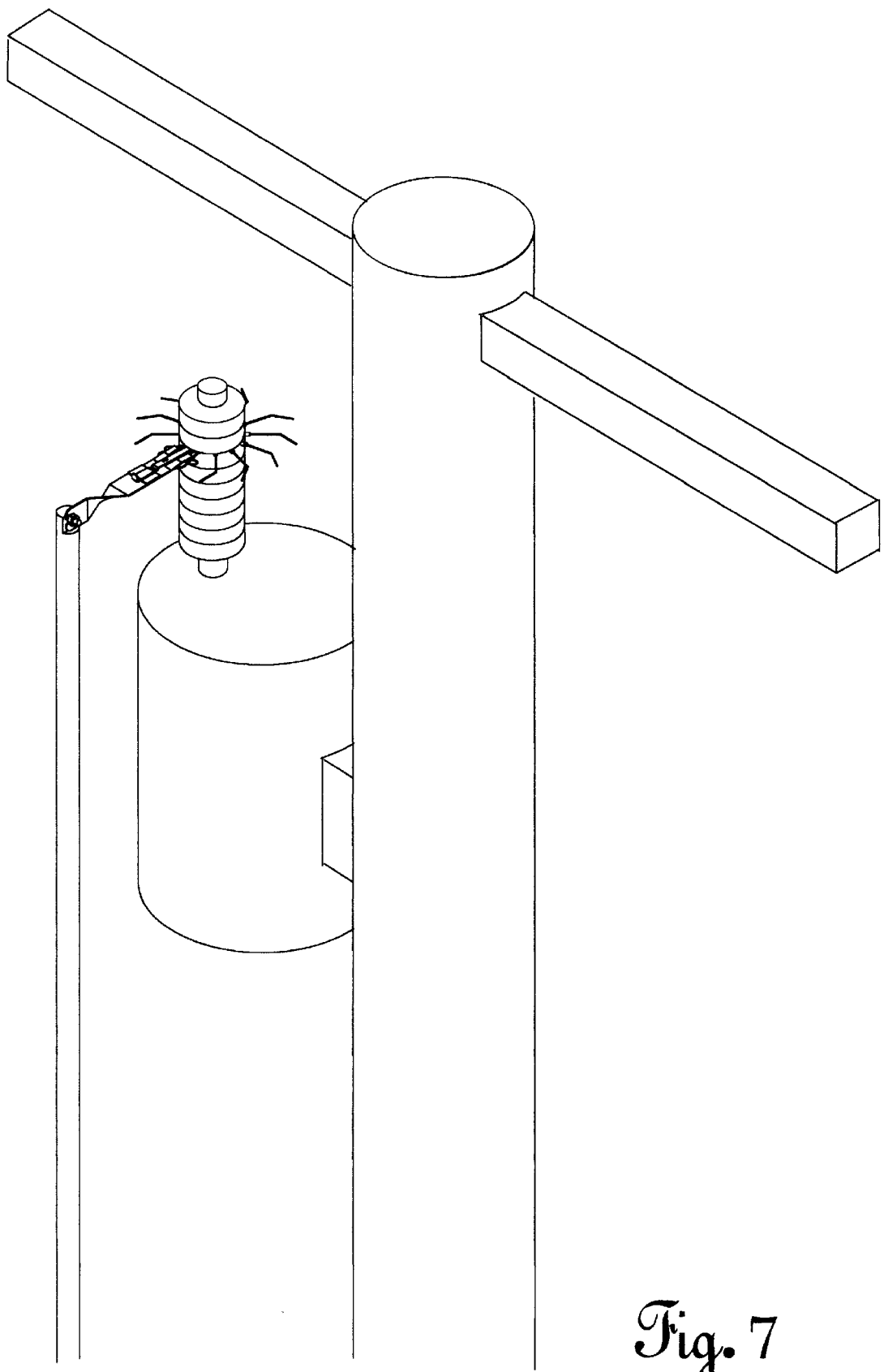
FIG. 7 is a perspective view of the apparatus, clip, and hot stick of FIG. 6 shown with clip being seated on an insulator.
Figure 8:
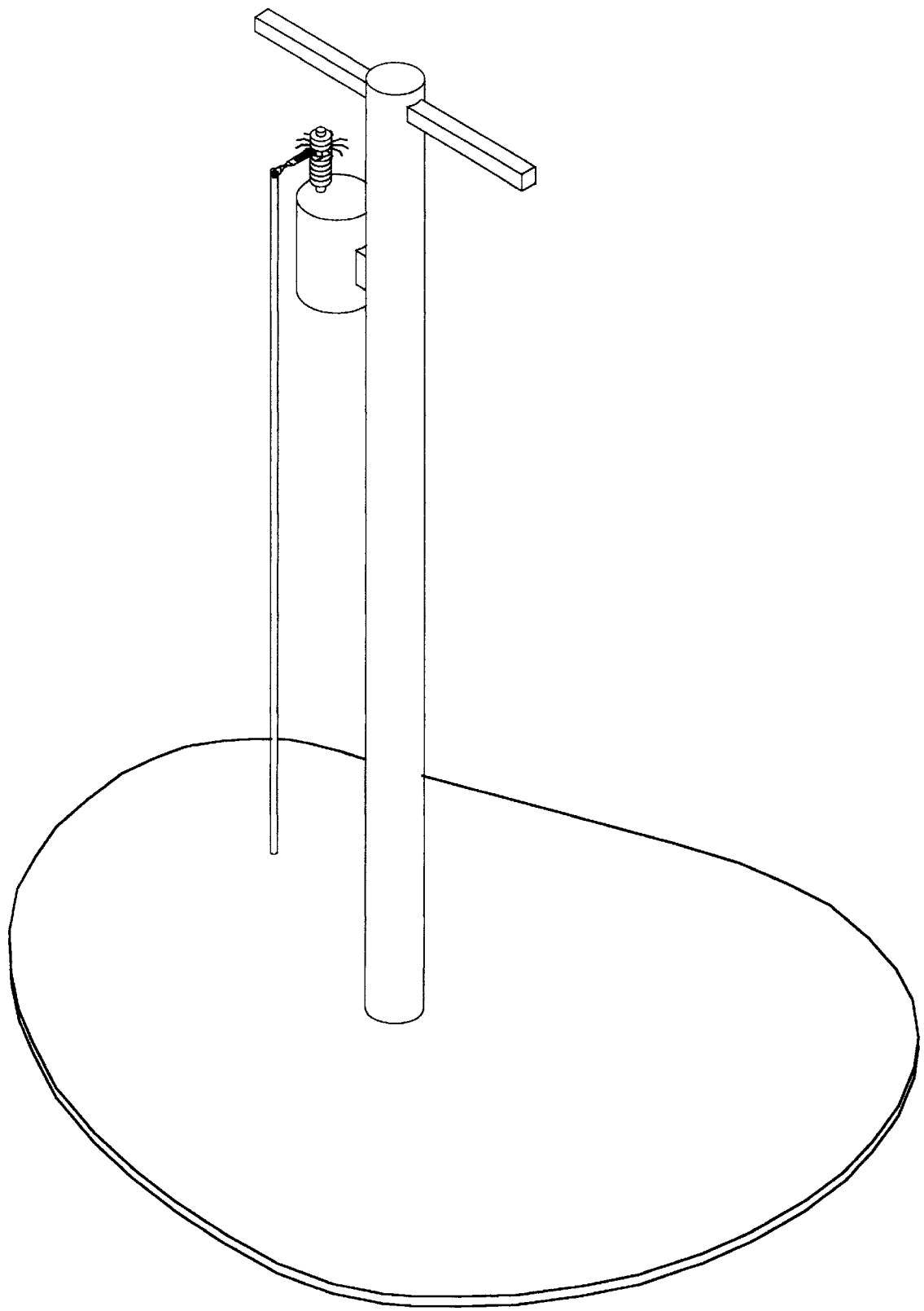
FIG. 8 is an increased field-of-view perspective of FIG. 7.

The body of the apparatus is an elongated flatten shank 22, made from any suitably stiff material that is convenient, such as steel or aluminum. FIG. 1. At one end of shank 22 there is a connecting means 24 for joining apparatus to a hot stick, an insulated stick that allows the apparatus to be used from a distance on electrically live systems. One mechanism for connecting to the hot stick is to have a 90 degree twist in shank 22 near the connecting end 24 and a groove to allowing for bolting the apparatus to the hot stick. FIG. 6. There is a plurality of conceivable mechanisms to attach the apparatus to a hot stick, the one described above is illustrative, and not intended to limit the possible adaptation for joining.

Figure 3:
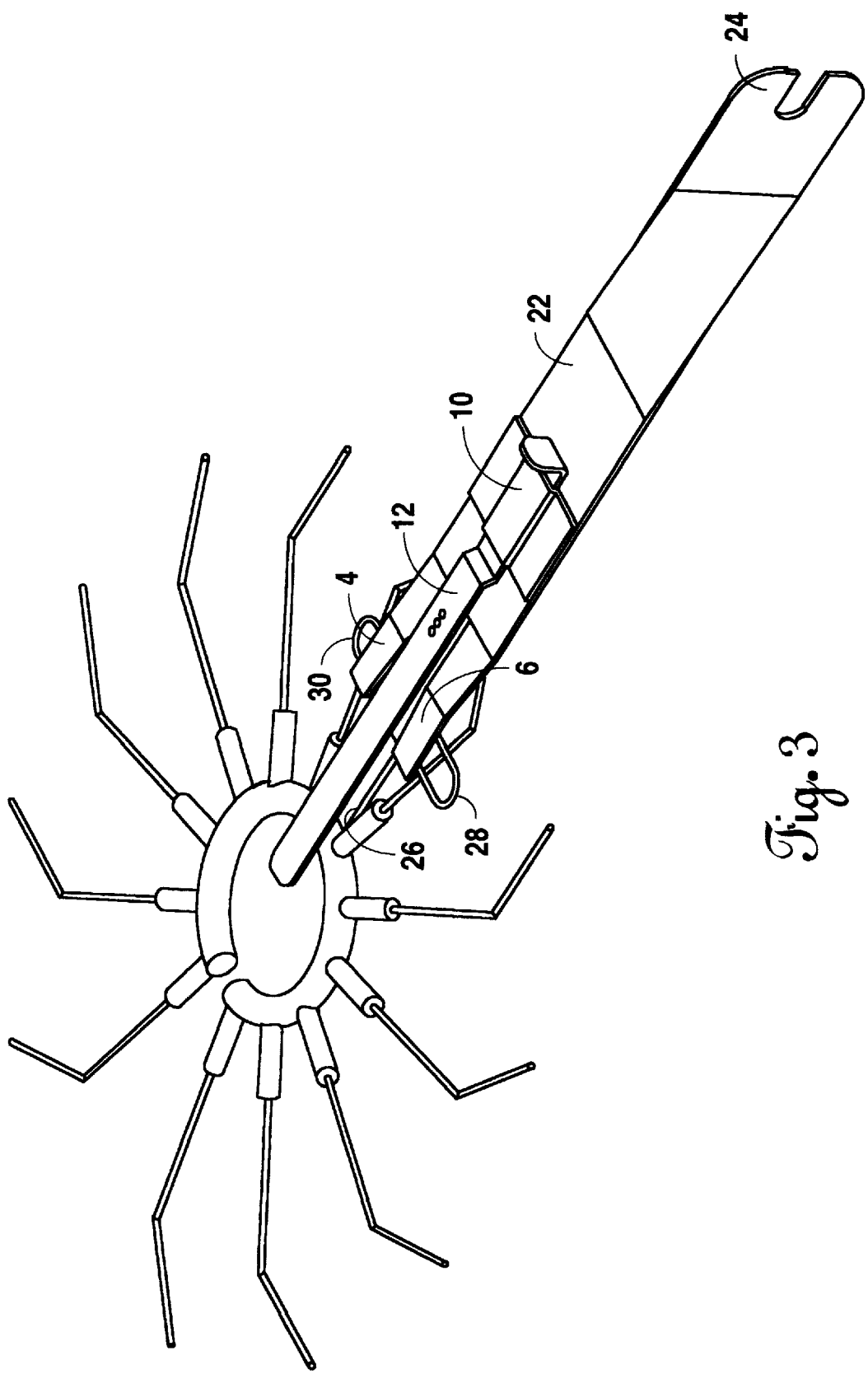
FIG. 3 is a perspective view of the apparatus of FIG. 1 showing apparatus engaged to a typically practiced clip.

The opposite end of shank 22 contains, generally, the fork 2 for docking with the clip, best illustrated in FIGS. 1, 3 and 4, and an attached slidable bar 12, further described below. The fork consist of three tines: 4, 6, and 8. These tines formed by two cuts made from the distal edge of shank 22. Tines 4 and 6 contain bends such that the extending ends of the tines are generally parallel with tine 8 but are raised, thus creating a planer space between tine 8, and the two raised tines 4 and 6 for the insertion of clip.

In the preferred embodiment, the two cuts forming tines 4, 6, and 8 are angled such that tines 4 and 6 gradually increase in width proximally, and corresponding middle tine 8 decrease in width proximally. FIG. 4.

Figure 2:
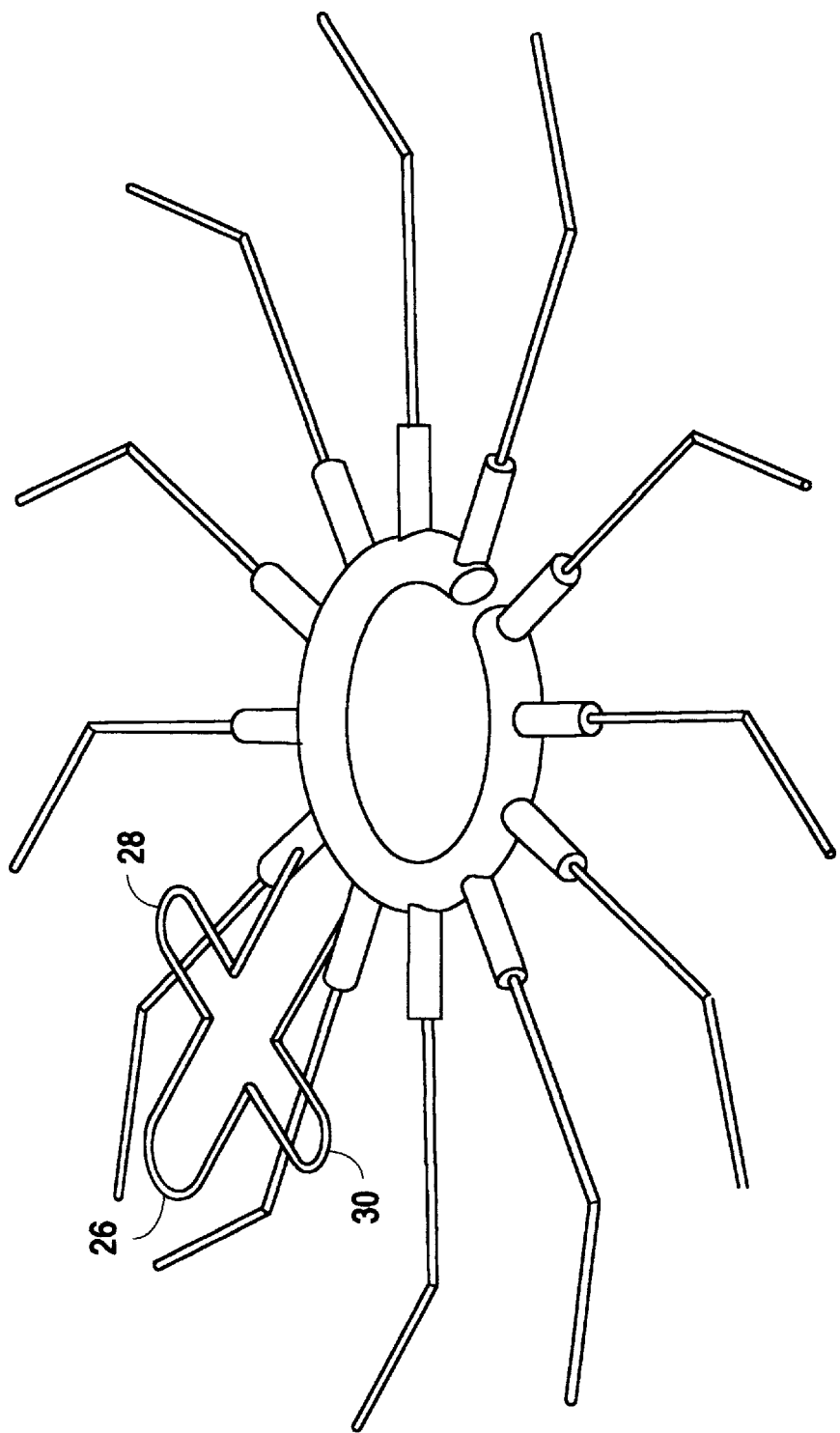
FIG. 2 is a perspective view of the Electrostatic Animal Guard (clip), as practiced, that can be installed by the invention.

FIG. 2 illustrates the T-shaped biasing spring of the clip. When the clip is inserted between the tines, the rear curve 26 of the clip's biasing spring is eventually arrested by the narrowing corridor between the two tines four and six created by the two cuts. FIGS. 3, 4. This arrangement provides a uniform stopping point for the clip. With the clip inserted, the two lateral curves 28 and 30 on the clip's biasing spring are between the plane of tine 8 and the plane tines 4 and 6. The tines may act as leaf springs to apply a light holding pressure on the clip. Additionally, the slope of tines 4 and 6 between the two bends allow the interior edge of tines 4 and 6 to contact the neck of curve 26, and thus prevents lateral movement of the clip.

Attached to shank 22, at a point behind fork 2 is the slidable bar 12. FIGS. 1, 3, and 4. The slidable bar 12 is held by an inverted U-shaped coupling 10 to the shank 22 by bolts, weld, other convenient means. The slidable bar, best illustrated in FIG. 1, has on its proximal end a bend 20 which limits distal movement, and a set of two bends 18 which limits proximal movement. Bends 18 also raises the distal end of the slidable bar to a height generally on the plane of tines 4 and 6. On the interior surface of the slidable bar 12, just distal of the bends 18, is projection 16. This projection 16 may be created by a rounded bolt, rivet head or similar means. FIG. 4 for example, shows the external side a series of partial depth punches. Multiple projections for 16 may facilitate the invention's use on clips of different sizes, however, for illustrative purposes one projection will be used in further discussion.

Once the clip is seated between tines 4, 6, and 8, the slidable bar can be manually pushed to its distal limit. In this position the projection 16 comes to rest in a position immediately beyond the rear curve 26 of the clip, with the projection 16 extending into the interior such that the clip cannot be removed without meeting the projection 16. Said another way, when the slidable bar 12 is fully extended projection 16 acts as a lock for the clip. FIGS. 3, 4, and 6.

Configured as above, slidable bar 12 extends such that the clip cannot lock onto the insulator unless the operator applies additional pressure to overcome the resistance of the lock. FIG. 4. This prevents accidental attachment of the clip. In essence, the operator is free to move the clip, for example, between the multiple sleeves of an insulator, without the clip attaching. Once the operator positions the clip on the preferred sight the operator, by applying additional pressure, can overcome the interface of projection 16 and the rear curve 26 of the clip. As slidable bar 12 moves proximally, bends 18 prevent further advancement of the apparatus, and thus prevents further advancement. This action coincides with the proper seating of the clip onto the insulator, and thus prevents the operator from advancing the clip to a point of damaging the clip. With the projection 16 no longer locking the clip, and tines 4, 6, and 8 providing only light holding pressure, the clip remains attached to the target when the apparatus is retracted.

Although the invention has been described with reference to specific embodiments, this description is not meant to be construed in a limited sense. Various modifications of the disclosed embodiment, as well as alternative embodiments of the invention will become apparent to persons skilled in the art upon the reference to the description of the invention. It is, therefor, contemplated that the appended claims will cover such modifications that fall within the scope of the invention.

I claim:

1. An apparatus for installation of spring clips of the type used in electrostatic animal guards, the apparatus comprising:

a body portion;

projecting tines oriented generally parallel to one another and spaced so as to allow a clip to be engaged between said projecting tines;

a sliding bar extendible generally parallel with a long axis of said projecting tines so as to contact a target receptacle surface before said clip attaches to said target receptacle, said sliding bar being retractable by the opposing force of said target receptacle allowing said clip to attach to a target;

locking means on said sliding bar where said locking means engages and holds said clip between said projecting tines when said sliding bar is distally extended, and said locking means disengages said clip when said sliding bar is moved proximally.

* * * * *